Jan. 9, 1968  E. O. SCHULZ  3,362,805
PRODUCTION OF FOAM GLASS
Filed April 21, 1965  2 Sheets-Sheet 1

Jan. 9, 1968  E. O. SCHULZ  3,362,805
PRODUCTION OF FOAM GLASS
Filed April 21, 1965  2 Sheets-Sheet 2

INVENTOR.
ERNST OTTO SCHULZ

United States Patent Office 3,362,805
Patented Jan. 9, 1968

3,362,805
PRODUCTION OF FOAM GLASS
Ernst Otto Schulz, Neuhaus am Rennweg, Germany, assignor to VEB Schaumglaswerk Taubenbach, Schmiedefeld, Kreis Neuhaus, Germany
Filed Apr. 21, 1965, Ser. No. 449,827
5 Claims. (Cl. 65—22)

ABSTRACT OF THE DISCLOSURE

A method for the production of foam glass capable of repeated use in foam glass formation wherein glass having an $SO_3$-content of at least 0.5% is ground, in the presence of a carbon carrier, to a glass powder which has a surface area of at least about 5000 $cm.^2/g.$, and where a water concentration bound to the surface of the powder is maintained at about $1.4 \times 10^{-6}$ $g./cm.^2$, the outer surface of the mass being heated to about 200° C. above the transformation temperature of the glass at a rate of heating which will provide a thin completely closed gas-tight glaze coating, without raising the temperature of the core portion of the mass to a temperature which would result in escape of water vapor and reaction gases, thereby maintaining the original composition of the reactants insuring foam formation, and then heating the mass to about 800–900° C. to transform it into foam glass.

In the production of foam glass, sulfate- or $SO_3$-containing glasses are mainly used, which in fine-ground condition and in the presence of 0.1–0.3% active carbon, or 0.5–1.5% other carbon fillers, for example coke, anthracite, etc., and under suitable heating to a temperature ranging from 700 to 900° C., provide a glass foam of polyhedral cell structure. Upon cooling down, this glass forms a closed porous foam glass having the usual weight by volume of between 0.14 and 0.2 $g./cm.^3$. The gases effecting the expansion are believed to result mainly from reduction and oxidation processes between $SO_3$ and C. It has been found that a third reactant also decisively influences the foam-developing ability and the foam developing rate, said reactant being the water adherent or bound to the glass surface.

During the preparation of the foam glass, 30% and more of waste material generally result from cutting the crude blocks to size and from breakage. Reuse of this waste in the further production of foam glass presents serious difficulties some of which are inherent and hard to overcome.

It is, for example, possible to grind waste foam glass, which still contains carbon, and melt it again together with the crude glass components after the addition of oxidizing agents, for example, sulfates or nitrates for the destruction of the remaining carbon. In practice, however, the waste glass portion influences the melting process unfavorably by extensive foaming at melting temperature, so that the melting capacity of the furnace decreases, and the maintenance of a constant $SO_3$ value in the crude glass is no longer guaranteed.

Furthermore, there is no ready possibility of feeding the waste material back into the grinding process of crude glass and additives, without influencing the yield per time unit and the known properties of the foam glass. It has been found that, after the expansion of the other powdery grinding media of $SO_3$-containing glass and carbon to a commercially suitable foam glass having a weight by volume of, for example, 0.14 to 0.20 $g./cm.^3$, only residues of $SO_3$ and C remain in the substance of the foam glass, while the water is practically used up.

The coarsely ground foam glass substance no longer has a significant foaming ability. However, if it is ground to an extent that there is obtained the same surface as the original foamable grinding mass, for example 7000 $cm.^2/g.$, the expandability is regained to some extent but is still insufficient in regard to time required for a repeated foaming to the standard volumetric weight. It was therefore, apparent that the foam glass substance, or the components, respectively, require a reactivation, i.e., by repeated surface formation with simultaneous absorption of water for example from air humidity.

In the following description of the invention reference will be made to the accompanying diagrams, in which—

Figure 5:
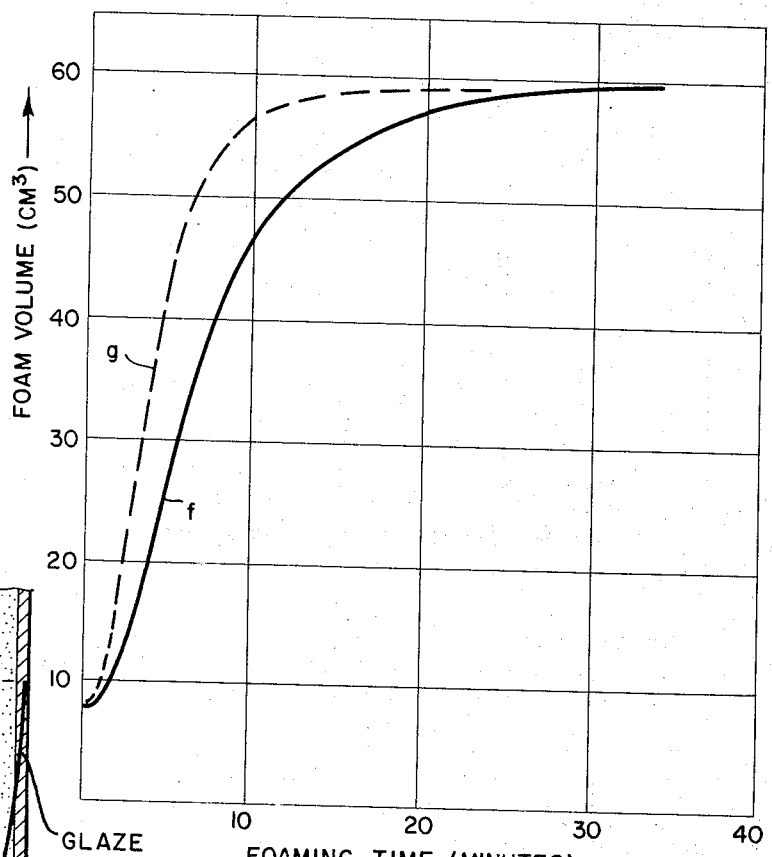

FIG. 5 compares foam formation in the method according to the invention with foam formation in an ordinary batch of glass.

Figure 1:
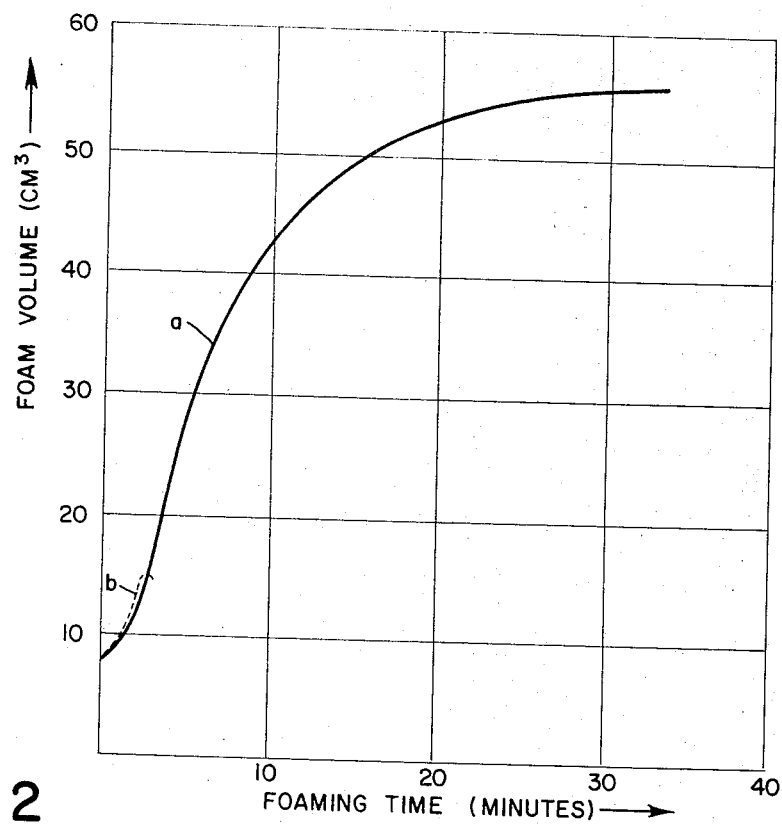
FIG. 1 illustrates foaming time as plotted against volume.

FIG. 1 shows by way of comparison, data found in a dilatograph where the volume of foam, e.g., in $cm.^3/g.$ substance and foaming time in minutes was determined.

In the diagram, line $a$ illustrates the formation of foam glass from a ground batch of crude glass and active carbon; line $b$ a ground batch consisting of 63% of crude glass and carbon, and approximately 37% of ground waste foam glass. From line $b$ it can be seen that the foaming stops after a very short time and at a low volume. This indicates that an addition of foam glass wastes to the grinding process is completely useless, and that they contribute nothing, or almost nothing, to the formation of foam volume. They play more or less the role of ballast materials and prevent the attainment of the standard volumetric weight.

The present invention has an object the elimination of these fundamental difficulties. It is an object of the invention to permit a complete return of the waste foam glass to the grinding process, connected with the production of foam glass; in this manner, the waste will afford, after grinding to a specific surface, a material similar to the original, powdery, foamable grinding media ground from crude glass and carbon, and will after repeated absorption of water, regain its foaming ability to such an extent that the foamable powder system obtained thereby can be foamed again to produce foam glass of the original volumetric weight at the same yield per time unit and under the same heating conditions.

Figure 2:
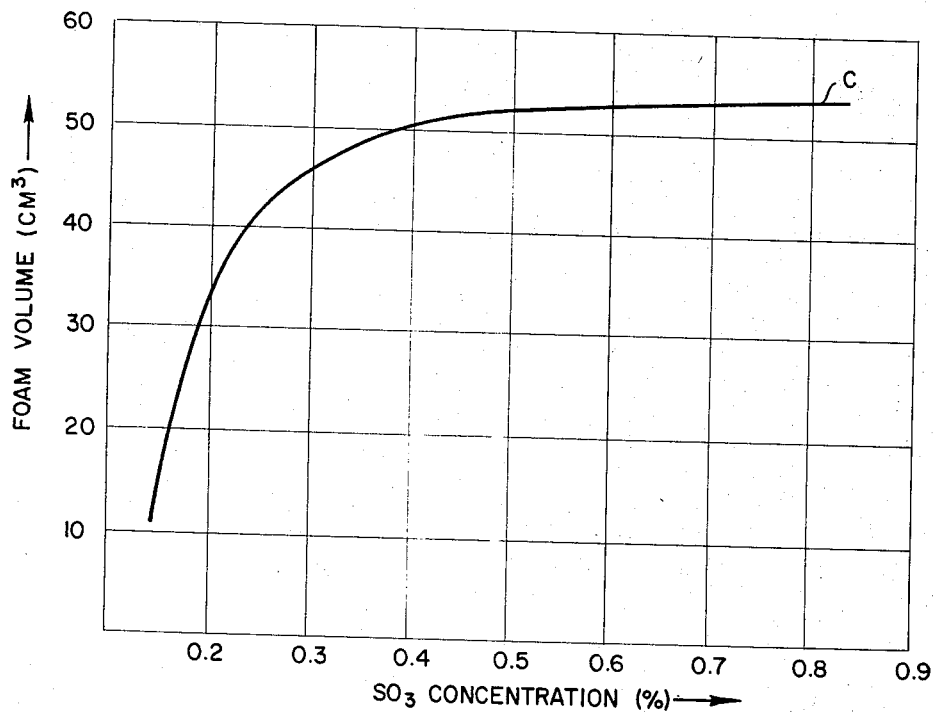
FIG. 2 shows dependence of volume of foamed glass on concentration of $SO_3$.

The present invention is based on the observations which have now been made as follows:

If we examine the manner in which the amount of foam develops with increasing $SO_3$ concentration, we find that, according to line $c$ in FIG. 2, the foaming volume at first increases steeply with increasing $SO_3$ concentration to a maximum, and that it changes only slightly with an $SO_3$ concentration of above 0.7%.

Figure 3:
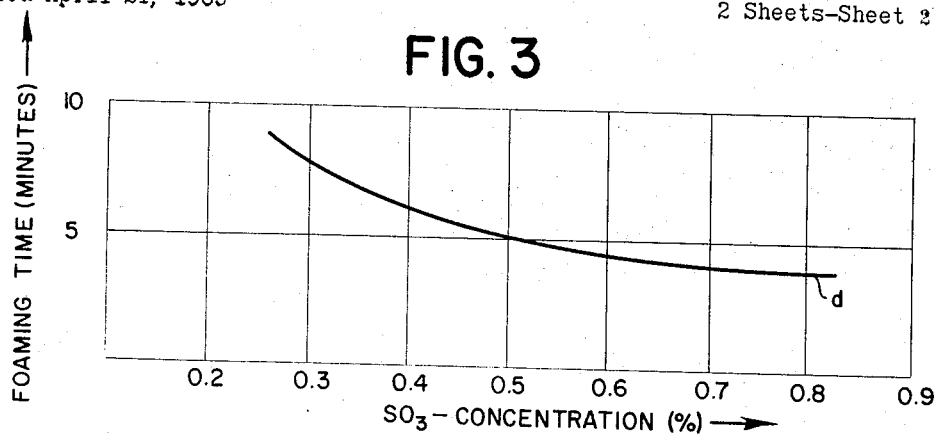
FIG. 3 foaming time dependent on $SO_3$ concentration.

Line $d$ in FIG. 3 shows the reduction of time, occurring under the same conditions, necessary for obtaining the maximum volume, likewise in dependence upon the $SO_3$ concentration.

Here too a marked decrease of the foaming time is noted, at first, with increasing $SO_3$ concentration; the time then approaches a constant value at, for example, 4 minutes.

For the expansion of a foamable grinding batch to foam glass of commercially required weight by volume of 0.14 to 0.20 $g./cm.^3$, about 0.22% $SO_3$ is used so that the foam glass obtained has a concentration which is smaller by that amount than that of the powdery, foamable, carbon-containing grinding batch.

If, for example, a glass of a concentration of 0.45%

SO₃ is used, a foam glass with 0.23% residual SO₃ may be obtained which—if foamed again—would result in a foam glass having practically no SO₃ at all in the second operation.

This attempt would, in the case of a repeated foaming of the foamed glass according to FIG. 2, line $c$, result in a strong decline of the foam yield and a considerable delay in obtaining the same.

A significant concept of the present invention in view of the observations as outlined above resides in the choice of so high an SO₃ concentration in the crude glass (e.g., 0.8%) that the foamed glass obtained therefrom contains a residual concentration which coincides with the curve branch of line $c$ in FIG. 2, which is almost horizontal. Despite the loss of, for example, 0.22% SO₃, an unchanged foamability is achieved. Similar considerations are valid as to the behavior regarding time, as illustrated by line $d$ of FIG. 3.

If a crude glass is chosen whose original SO₃ concentration is higher than that limit concentration of SO₃ by, at least, the amount of SO₃ used up during a foaming process for the volume formation, and for losses, then a foam glass may be produced from the substance of the original foam glass, according to the present invention, without considerable decrease of the foamability, and without any significant decrease of the velocity of the foam formation. The characteristic limit concentration valid for each individual foamable grinding batch employed, fresh glass and carbon carrier, can be determined by way of foaming tests by variation of the SO₃ contents of the crude glass under repeatable conditions, and lies, on the average, above 0.6% SO₃, while the SO₃ amounts reacted during the foaming processes are registered analytically in a known manner.

The foamable grinding batches consisting of SO₃-containing glass and C-carriers, endure loss of water, SO₃, and C when heated to softening temperature or sinter temperature, respectively, or below. Part of the water adhering or bound to the crude glass is given off, for example, to the outside atmosphere or to the furnace chamber atmosphere, respectively. When the aforementioned temperatures, e.g., at 500 to 600° C., are approached, the reactions between the reactants water, SO₃, and C start, and reaction gases escape from the mass. The potential foaming ability of the media and the reaction velocity are reduced by the concentration losses encountered by the reactants. In order to increase the yield of foamed glass per time unit and to preserve a sufficient SO₃ concentration necessary for the second foaming process, it is important to keep those losses of materials participating in the formation of gas as low as possible.

According to the present invention, the foamable powdery masses are applied to a mold or to free surfaces, with uniform thickness, and subsequently subjected to such intensive heating that they coat themselves with a thin—in proportion with the thickness of the layer applied—completely closed, gas-tight glazing. This process is carried out at such a speed that, until this condition is reached, the temperatures prevailing in the major portion of the gas-tight enclosed powder masses are still so low that an escape of water bound to the glass, or reaction gases, does not occur, or is kept at insignificant amounts, so that the reactants show a practically unchanged concentration after the total mass has been heated to 700 to 900° C., in a known manner.

Figure 4:
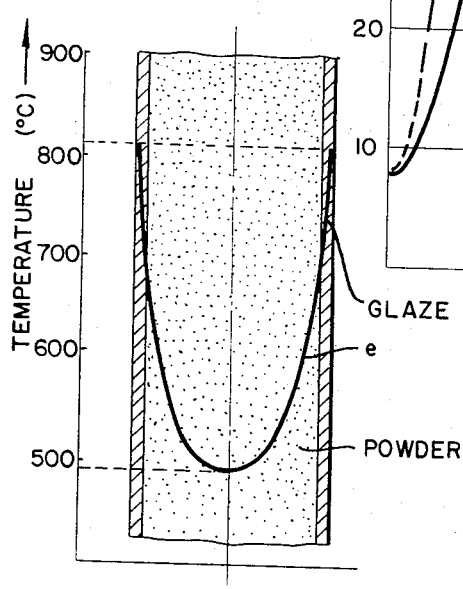
FIG. 4 illustrates formation of a glaze dependent on temperature.

FIG. 4 shows an example of the temperature distribution in the interior of the mass at the moment the gas-tight glaze coating is reached (line $e$). Of basic significance is the utilization of the inventive concept, namely that, contrary to the known methods of temperature control during the foam glass production, the heating of the powder material may not be carried out uniformly or in any desired manner until sintering or foaming occurs, but that it is important to subject the molds and the foaming material from the start of the heating to a maximally high, extreme thermal stress until the formation of the gas-tight glazing is accomplished. When this has been reached, the thermal stress is to be controlled so that the mass is further heated uniformly, if possible, through the entire cross-section.

It is another object of the present invention to grind the substance of a foamed glass to be used for repeated foaming to a specific surface of, for example, 5000 to 8000 cm.²/g., as it is also required for the powdery initial grinding batch consisting of fresh glass and carbon. This surface is specifically necessary in order to apply to the material to be foamed the required surface concentration of water either through absorption of humidity from the air or by introduction of water or water vapor during the grinding process. If the foamed glass is ground to an insufficient surface of, for example, only 2000 cm.²/g., it shows practically no ability to expand, even if both aforementioned requirements have been fulfilled.

The method according to the present invention guarantees the presence of sufficient water for a satisfactorily high volume yield of glass combined with relatively high foam developing speed, if the glass component of the foamable mixture is supplied with a surface concentration of 1.4 to 4×10⁻⁶ g. water per cm.², which must be bound at the surface, or 0.7% to 3.2% water and more, relative to the glass mass. The water saturation as described above is preferably facilitated by choosing the glass composition such that it can discharge more than 1 milligram/g. alkali metal oxide according to the grits method.[1] Moreover, the alkaline earth content of the glass must be below 7% in order to avoid interruptions of the sintering and foaming processes by devitrification.

The process according to the present invention will be more fully described in an example, the percentages are given by weight.

Example

A crude glass is melted from sulfate-containing raw material mixtures in a known manner, the crude glass having a constant SO₃ content of 0.8 percent and a composition of SiO₂=74.5%, R₂O=19%, RO=6.5%. The crude glass is preground and subsequently ground in a ball mill or tube mill, possibly iron-free, to a specific surface of 6000 cm.²/g., using, 0.15% to 0.30% of active carbon obtained by incomplete combustion of consumer gas or methane charged with vapors of aromatic hydrocarbons. All figures in this example should be understood to be given by way of illustration only and many variations of the composition of the glass, the specific surface and the active carbon are possible without departing from the spirit of the invention.

Other types of suitable carbon carries may also be used. The water required for the reaction of the glass composition of the grinding bath, as mentioned before, is taken from humidity of the air, but may also be introduced, preferably during the grinding process, in liquid or vaporous condition. The foamable grinding batch, for example 5 kg., is applied freely as a layer of 25 to 40 mm. thickness onto a flat steel mold, with or without cover, and the mold is pushed into the heating chamber of a chamber furnace or a tunnel furnace whose atmosphere is free of oxygen, as far as possible. The heat input is so intensive that the mold evenly reaches a temperature of medium red heat, but at least 700° C. after, about, 5 to 20 minutes that, while at the moment of the formation of the completely closed, gas-tight glaze coating, the enclosed main mass in the core does not reach a temperature above 400° C.

The mold and the material applied to same are subsequently heated in such a manner that they reach a suitable peak temperature of, for example, 850° C. in the customary manner within 10 to 30 minutes, for example, within 20 minutes, at which temperature the

---

[1] See Kitaigorodski, "Technologie des Glases" p. 69, VEB Publishers "Technik" Berlin 1959. By "grit value" this method understands the amount of glass which dissolves when 2 g. of glass powder (grit) are boiled in water.

foaming to foamed glass takes place in the customary method.

In the course of the production, a portion of the foam glass obtained in the above described manner, e.g. the waste from cutting, may be mixed with fresh glass and carbon carriers in any desired proportion and ground to the original surface in the same manner as the original powdery material, charged again with water, subjected to heat treatment in the same manner and within almost the same time, and thus transformed into foamed glass.

FIG. 5 shows in line $f$ the foaming behavior of the powdery original material consisting of $SO_3$-containing crude glass and active carbon made according to the example, line $g$ illustrates the foaming behavior of a grinding batch consisting of 2/3 of the re-used powdery material of the foam glass obtained first by foaming and being then re-ground. It can be recognized that the foaming behavior of the last-mentioned material not only reaches the values of the foamable powder material, but even surpasses them.

Although the invention has been described in considerable detail with particular reference to certain preferred embodiments thereof, variations and modifications can be effected within the spirit and scope of the invention as described hereinabove and as defined in the appended claims.

We claim:

1. A method for the production of foam glass capable of repeated use in foam glass formation which comprises the steps of grinding a glass having an $SO_3$-content of at least 0.5% in the presence of a carbon carrier to a glass powder having a surface area of at least about 5000 cm.$^2$/g., providing a concentration of water bound to the surface of said powder which is at least about $1.4 \times 10^{-6}$ g./cm.$^2$ of glass powder surface, heating the outer surface of said mass to a temperature of about 200° C., above the transformation temperature of said glass, at such a rate of heating that a thin, completely closed, gas-tight glaze coating is formed at said surface, without raising the temperature of the core portion of the mass to a temperature which would result in escape of water vapor and reaction gases from said mass, thereby maintaining the original composition of the reactants insuring foam production, and then heating said mass at a temperature from about 800 to about 900° C. to transform said mass into foam glass of density less than 0.17 g./cm.$^2$.

2. A method for the production of foam glass capable of repeated use in foam glass formation which comprises the steps of grinding a glass having an $SO_3$-content in the range of 0.5% to about 1.2% by weight in the presence of an amount of carbon carrier having a carbon equivalent from 0.15 to 0.3% by weight, to a glass powder having a surface area of at least about 5000 cm.$^2$/g. providing a concentration of water, bound to the surface of said powder which is at least about $1.4 \times 10^{-6}$ g./cm.$^2$ of glass powder surface, heating the outer surface of said mass to a temperature of about 200° C. above the transformation temperature of said glass, at such a rate of heating that a thin, completely closed, gas-tight glaze coating is formed at said surface, without raising the temperature of the core portion of the mass to a temperature which would result in escape of water vapor and reaction gases from the mass, thereby maintaining the original composition of the reactants insuring foam production, and then heating said mass at a temperature from about 800 to about 900° C. to transform said mass into foam glass of density less than 0.17 g/cm.$^2$.

3. A method for the production of foam glass capable of repeated use in foam glass formation which comprises the steps of grinding a glass having an $SO_3$-content of at least 0.5% in the presence of an amount of carbon carrier equivalent to at least 0.15% by weight of active carbon to a glass powder having a surface area of at least 5000 cm.$^2$/g., adding to said powder during grinding moisture to secure a powder having a concentration of water bound to the surface of said powder which is at least $1.4 \times 10^{-6}$ g./cm.$^2$ of glass powder surface and in the range of 0.7 to 3.2% by the weight calculated on the mass of glass powder, heating the outer surface of said mass to a temperature of about 200° C. above the transformation temperature of said glass, controlling the rate of heating so that a thin completely closed gas-tight glase coating is formed at said surface without raising the temperature of the core portion of the mass to a temperature which would result in escape of water vapor and reaction gases from said mass, thereby maintaining the reactants $SO_3$ and C in such a concentration to insure foam production, and then heating said mass at a temperature from about 800 to about 900° C. to transform said mass into a foam glass of density less than 0.17 g./cm.$^2$.

4. The method according to claim 3 wherein the starting glass has an $Na_2O$-content so as to release more than 1 mg. $Na_2O$/g. glass according to the grits method but having an alkaline earth oxide content of less than 7%.

5. A method for the production of foam glass which comprises the steps of grinding a glass having an $SO_3$-content of at least 0.5% in the presence of an amount of carbon carrier equivalent to at least 0.15% by weight of active carbon to a glass powder having a surface area of at least 5000 cm.$^2$/g., adding to said powder during grinding, moisture to secure a powder having a concentration of water bound to the surface of said powder which is at least $1.4 \times 10^{-6}$ g./cm.$^2$ of glass powder surface and at least 0.7% by weight of mass calculated on the glass powder, heating the outer surface of said mass to a temperature of about 200° C. above the transformation temperature of said glass, controlling the rate of heating so that a thin, completely closed, gas-tight glaze coating is formed at said surface without raising the temperature of the core portion of the mass to a temperature which would result in escape of water vapor and reaction gases from said inner portion, heating said mass at a temperature of from about 800° to about 900° C. to transform said mass into a foam glass of density less than 0.17 g./cm.$^2$, mixing a portion of said foamed glass with fresh glass, grinding said mixture in the presence of an amount of carbon carrier equivalent to the amount of active carbon required to bring the total carbon content of the mixture up to at least 0.15% active carbon, adding moisture as specified for the original grinding and repeating the heating steps to secure a further foamed mass.

References Cited

UNITED STATES PATENTS

| | | | |
|---|---|---|---|
| 1,967,375 | 7/1934 | Slayter | 65—22 |
| 2,060,017 | 11/1936 | Benner | 65—22 |
| 2,123,536 | 7/1938 | Long | 65—22 |
| 2,596,669 | 5/1952 | Ford | 65—22 |
| 2,691,248 | 10/1954 | Ford | 65—22 |
| 3,163,512 | 12/1964 | Schill et al. | 65—22 |

DONALL H. SYLVESTER, *Primary Examiner.*

G. R. MYERS, *Assistant Examiner.*